(12) United States Patent
Lewis et al.

(10) Patent No.: US 11,719,390 B2
(45) Date of Patent: Aug. 8, 2023

(54) APPARATUS, SYSTEM, AND METHOD FOR DETERMINING A LOCATION

(71) Applicant: mIQroTech, Inc., State College, PA (US)

(72) Inventors: Meade Lewis, State College, PA (US); Dominick Colosimo, State College, PA (US)

(73) Assignee: mIQroTech, Inc., Tampa, FL (US)

( * ) Notice: Subject to any disclaimer, the term of this patent is extended or adjusted under 35 U.S.C. 154(b) by 806 days.

(21) Appl. No.: 16/281,632

(22) Filed: Feb. 21, 2019

(65) Prior Publication Data

US 2020/0271277 A1 Aug. 27, 2020

(51) Int. Cl.
| | |
|---|---|
| *F17D 5/02* | (2006.01) |
| *G05D 1/10* | (2006.01) |
| *B64C 39/02* | (2023.01) |
| *G05D 1/02* | (2020.01) |
| *G06N 7/01* | (2023.01) |
| *B64U 101/00* | (2023.01) |

(52) U.S. Cl.
CPC ............. *F17D 5/02* (2013.01); *B64C 39/024* (2013.01); *G05D 1/0202* (2013.01); *G05D 1/101* (2013.01); *G06N 7/01* (2023.01); *B64U 2101/00* (2023.01)

(58) Field of Classification Search
CPC ......... G05D 1/101; G05D 1/0202; F17D 5/02
See application file for complete search history.

(56) References Cited

U.S. PATENT DOCUMENTS

| | | | |
|---|---|---|---|
| 7,442,291 B1 | 10/2008 | Discenzo | |
| 7,657,392 B2 | 2/2010 | Gysling | |
| 10,962,437 B1 * | 3/2021 | Nottrott | ............. G01N 21/3504 |
| 2003/0146749 A1 | 8/2003 | Srinivasan | |
| 2016/0061640 A1 | 3/2016 | Joshi | |
| 2018/0058202 A1 | 3/2018 | Disko | |
| 2020/0182842 A1 * | 6/2020 | Kasten | ............... G01N 33/0027 |

FOREIGN PATENT DOCUMENTS

WO   WO-2017069979 A1 *   4/2017   ............... G01N 1/26

* cited by examiner

*Primary Examiner* — Jeff A Burke
*Assistant Examiner* — Christopher A Buksa
(74) *Attorney, Agent, or Firm* — McCarter & English, LLP; James M. Smedley; Alex Korona

(57) ABSTRACT

A method is disclosed. The method includes providing a sensor attached to a vehicle, controlling the vehicle to move toward a system, using the sensor to sense data, providing the sensed data to a detection module including computer-executable code stored in non-volatile memory, and controlling the sensor and the vehicle to perform a raster scan when the detection module detects a variation in the sensed data. The method also includes providing sensed raster scan data to the detection module, using the detection module to generate a plurality of probability distribution curves based on the sensed raster scan data, and using the detection module to generate a vector based on the plurality of probability distribution curves. The vector points to a location of the system.

17 Claims, 11 Drawing Sheets

APPARATUS, SYSTEM, AND METHOD FOR DETERMINING A LOCATION

TECHNICAL FIELD

The present disclosure generally relates to an apparatus, system, and method for determining a location, and more particularly to an apparatus, system, and method for determining a location of, for example, a structural deficiency or a predetermined condition.

BACKGROUND

Fluid-carrying structures such as oil pipelines transport fluid (e.g., refined oil or crude oil) over any desired distance (e.g., relatively short distances within industrial facilities and/or relatively long distances of hundreds of miles). Pipelines are typically constructed from structural materials such as steel that may be subject to corrosion and material failure. Similarly, other structures that store fluid, such as tanks and other storage structures, are also subject to corrosion and material failure. For example, structural damage and failures are estimated to cost the pipeline industry tens of billions of U.S. dollars each year. Additionally, leaks and spills caused by structural damage and failure of pipelines and other storage and transfer systems cause spills that significantly damage the environment.

Varying conventional approaches are used to monitor fluid-carrying structures such as pipelines to attempt to detect potential failures before they occur and cause environmental and financial damage. For example, some monitoring technologies are inserted through pipeline walls. Although monitoring data may be obtained using these technologies, the penetration involved with inserting the monitoring technology may itself cause leaks to pipelines. Other approaches utilize radioactive materials (e.g., Uranium, Cesium, Americium, and/or Plutonium) in monitoring pipelines, which are harmful to personnel and the environment. Accordingly, conventional techniques do not provide a safe technique for effectively monitoring flow in passages such as pipelines that avoid damage to the structures being monitored and the surrounding environment. Additionally, conventional methods do not provide an effective technique for determining a precise location of damaged portions of structures. For example, conventional techniques do not provide a method for pinpointing a leak or other deficiency on a structure that may be long or large, such as a pipeline that transfers fluid over a long distance. Accordingly, it may take a relatively long time to determine a precise location of a leak or other deficiency on a pipeline or other storage structure based on conventional techniques.

The exemplary disclosed apparatus, system, and method are directed to overcoming one or more of the shortcomings set forth above and/or other deficiencies in existing technology.

SUMMARY OF THE DISCLOSURE

In one exemplary aspect, the present disclosure is directed to a method. The method includes providing a sensor attached to a vehicle, controlling the vehicle to move toward a system, using the sensor to sense data, providing the sensed data to a detection module including computer-executable code stored in non-volatile memory, and controlling the sensor and the vehicle to perform a raster scan when the detection module detects a variation in the sensed data. The method also includes providing sensed raster scan data to the detection module, using the detection module to generate a plurality of probability distribution curves based on the sensed raster scan data, and using the detection module to generate a vector based on the plurality of probability distribution curves. The vector points to a location of the system.

In another aspect, the present disclosure is directed to a detection system. The detection system includes a detection module, comprising computer-executable code stored in non-volatile memory, a processor, and a VOC sensor attached to a vehicle. The detection module, the processor, and the VOC sensor attached to the vehicle are configured to control the vehicle to move toward a system, use the VOC sensor to sense VOC data, control the VOC sensor and the vehicle to perform a planar scan when the detection module detects a variation in the sensed VOC data, sense planar scan VOC data during the planar scan, generate a plurality of Gaussian curves based on the sensed planar scan VOC data, and generate a vector based on the plurality of Gaussian curves. The vector points to a location of the system.

DETAILED DESCRIPTION AND INDUSTRIAL APPLICABILITY

Figure 1:
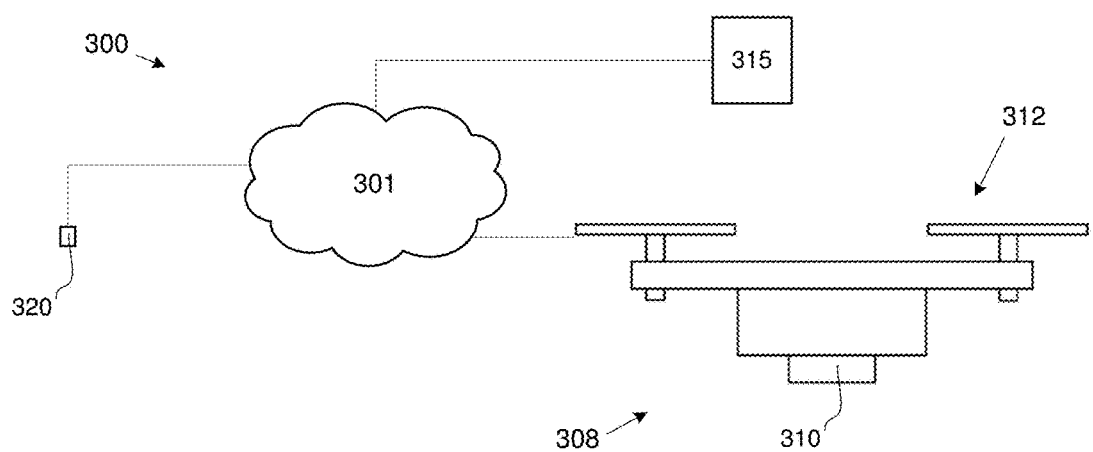
FIG. 1 is a schematic view of an exemplary embodiment of the present invention.

FIG. 1 illustrates an exemplary system 300 for detecting a condition. For example, system 300 may detect a leak, spill, change in ambient conditions, and/or any other suitable predetermined criteria. For example, system 300 may identify a location having a condition matching any desired criteria. For example, system 300 may identify an occurrence and/or location of a leak, spill, fire, and/or any other deficiency or condition meeting predetermined criteria.

System 300 may include a sensor system 308, a detection module 315, and a user interface 320. For example, system 300 may include a plurality of sensor systems 308 and/or user interfaces 320. Sensor system 308, detection module 315, and user interface 320 may be connected for example via a network 301, which may be similar to exemplary network 201 disclosed below regarding FIG. 13.

Figure 2:
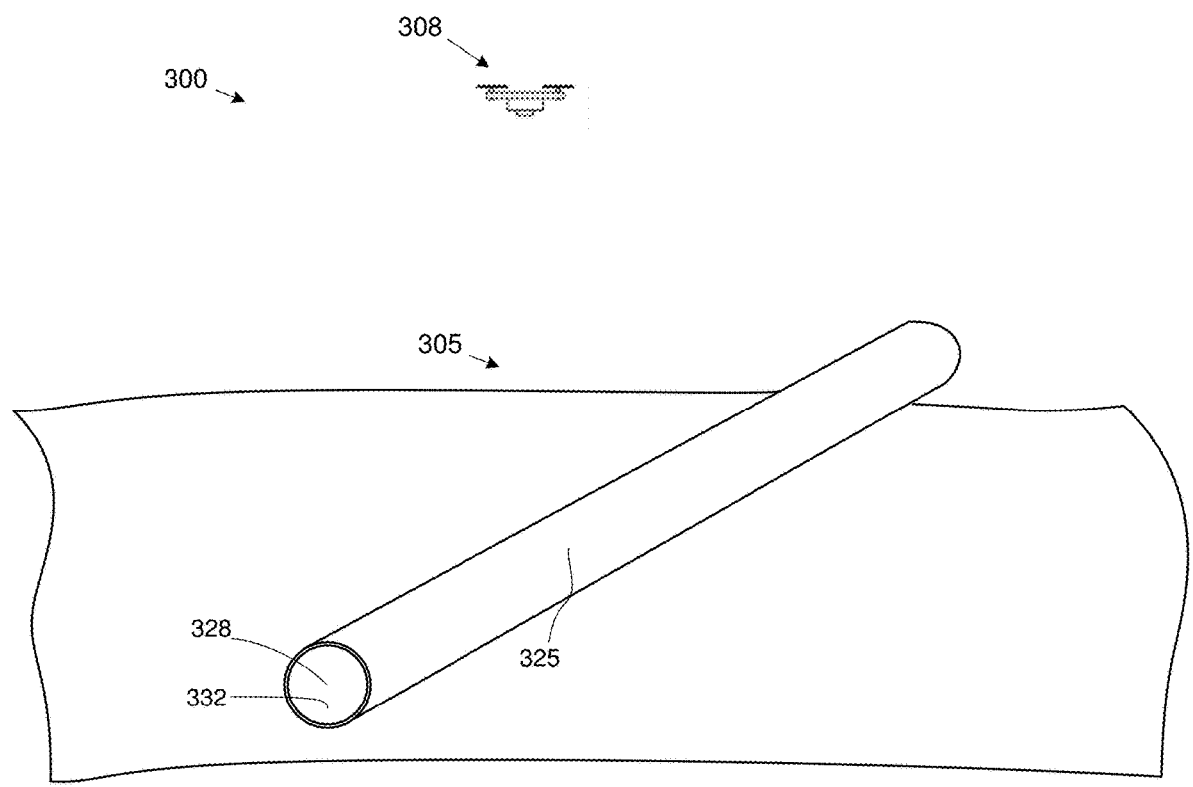
FIG. 2 is a schematic view of an exemplary embodiment of the present invention.

As illustrated in FIG. 2, system 300 may be used to detect a location of a structural deficiency or predetermined conditions of a passage system 305. Passage system 305 may be any system that transports an exemplary flow material 332 such as, for example, gaseous fluid material, liquid fluid material, and/or solid material (e.g., solid material capable of acting in a fluid-like manner). Passage system 305 may include a plurality of members 325. For example, members 325 may be any suitable structural member for transporting exemplary flow material 332, e.g., a structural member including a passage 328. For example, member 325 may be a structural piping member having passage 328 (e.g., any suitable substantially hollow passage or channel). For example, member 325 may be a structural metal (e.g., steel) pipe, a structural plastic (e.g., PVC) pipe, and/or a structural member formed from any suitable material for forming a passage for transporting flow material. Member 325 may have any suitable shape for transporting flow material such as, for example, a circular or elliptical shape, a square or rectangular shape, a polygonal shape, and/or any other suitable shape. Also for example, member 325 may be any suitable member for transporting a flow of material through exemplary vehicles, equipment, and/or structures disclosed, e.g., above. For example, member 325 may also be a relatively thin metal tubing (e.g., copper tubing) such as a passage for transporting fluid through a vehicle (e.g., fuel, hydraulic fluid, and/or coolant), industrial equipment, and/or a structure.

Exemplary flow material 332 may be any suitable material that may be transported via members 325. For example, flow material 332 may be a fluid material (e.g., gaseous fluid material and/or liquid fluid material), a solid material capable of acting in a fluid-like manner (e.g., a granular material such as fine aggregate such as sand and/or coarse aggregate such as stones that may be mixed with water or other fluid), and/or a combination of any suitable gaseous fluid, liquid fluid, and/or fluid-like solid material. For example, flow material 332 may be a fossil fuel in fluid form (e.g., refined oil or crude oil, natural gas, and/or any other suitable type of fossil fuel), water, air, oxygen, carbon dioxide, any suitable chemical in fluid form, waste or wastewater, and/or any other suitable material that may flow through a passage.

Flow material 332 may be, for example, transported under pressure through members 325 of passage system 305. For example, a plurality of members 325 may be attached together and placed above and/or underground to transfer flow material 332 over any suitable distance (e.g., members 325 may be attached together by fasteners, welding, and/or any other suitable technique to form passage system 305). For example, passage system 305 may transport flow material 332 (e.g., under pressure) between a plurality of locations. Passage system 305 may transport flow material 332 between one or more of an industrial activity (e.g., refinery, chemical production facility, drilling platform or location, and/or any other suitable industrial facility), commercial activity utilizing flow material 332 (e.g., a factory or other production facility, an airport, a city, a port, and or any other suitable commercial activity), multiple locations in a vehicle utilizing flow material 332, and/or multiple locations in the same structure or in different structures. For example, passage system 305 may transport flow material 332 between locations that may be located at any suitable distance from each other such as, e.g., tens or hundreds of feet (e.g., different points or locations in the same vehicle, structure, and or facility), thousands of feet (e.g., points or locations in differing vehicles, structures, and/or facilities), and/or several miles, dozens of miles, hundreds of miles, and/or thousands of miles from each other (e.g., pipelines transporting flow material 332 over relatively long distances).

Figure 3:
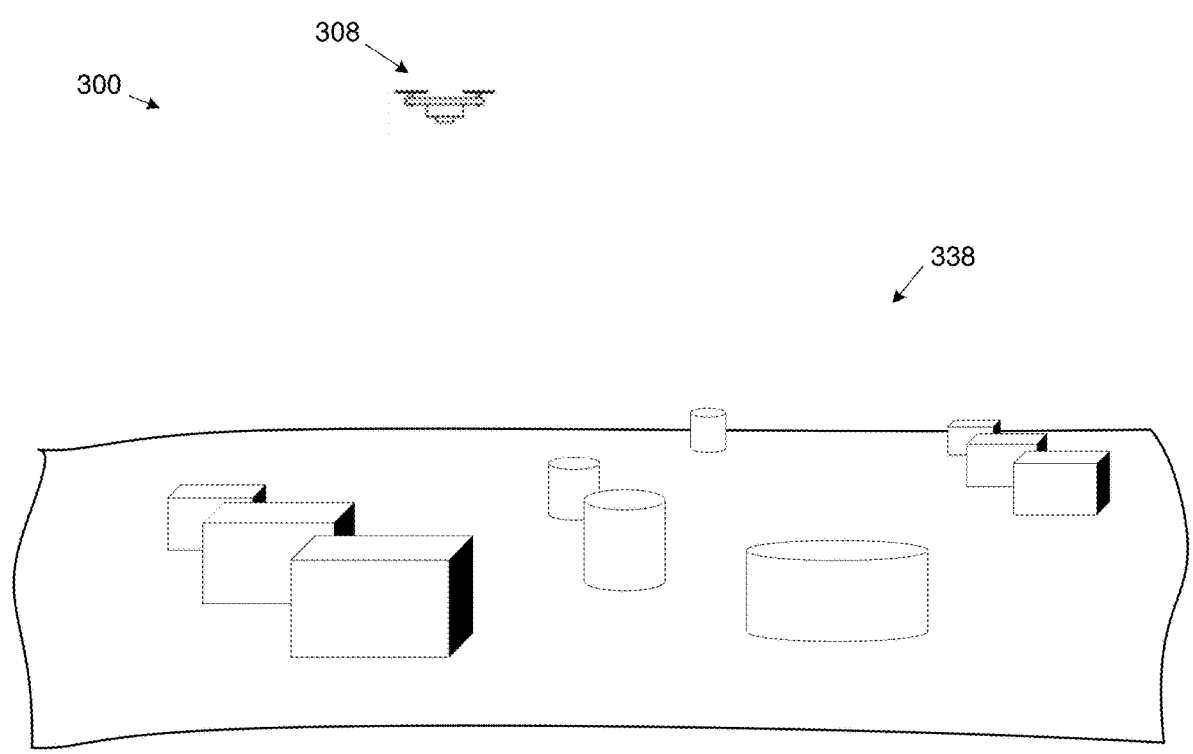
FIG. 3 is a schematic view of an exemplary embodiment of the present invention.

As illustrated in FIG. 3, system 300 may be used to detect a location of a structural deficiency or predetermined conditions of a system 338. System 338 may be for example, an industrial, commercial, or residential area that may include one or more large structures and/or a plurality of small structures. For example, system 338 may be an oil refinery, a chemical processing and/or storage complex, an airport or seaport area, an urban area, and/or any other desired area. For example system 338 may include one or more fluid storage structures such as tanks, one or more inhabited structures, one or more transportation structures such as bridges or culverts, one or more fluid delivery systems such as pipelines, and/or any other suitable structures or systems that may store, transfer, manufacture, use, and/or be associated with a liquid fluid, a gaseous fluid, and/or solid materials that may produce conditions and/or have characteristics that may be sensed by system 300.

Returning to FIG. 1, sensor system 308 may include a sensor assembly 310 and a vehicle 312. Sensor assembly 310 may be attached to and/or partially or entirely integrated within vehicle 312.

Vehicle 312 may be any suitable vehicle or device to which sensor assembly 310 may be attached and/or integrated. For example, vehicle 312 may be a drone such as an unmanned aerial vehicle (e.g., aerial drone), any suitable aircraft such as a fixed wing (e.g., airplane or jet) or rotary wing (e.g., helicopter) aircraft, an airship such as a dirigible balloon, and/or any other vehicle suitable for traveling above ground. It is also contemplated that vehicle 312 may be a waterborne and/or submersible vehicle such as a submarine or other suitable watercraft. It is further contemplated that vehicle 312 may be a ground vehicle such as a car or truck, a hovercraft, and/or any other suitable vehicle for facilitating an operation of system 300.

Figure 4:
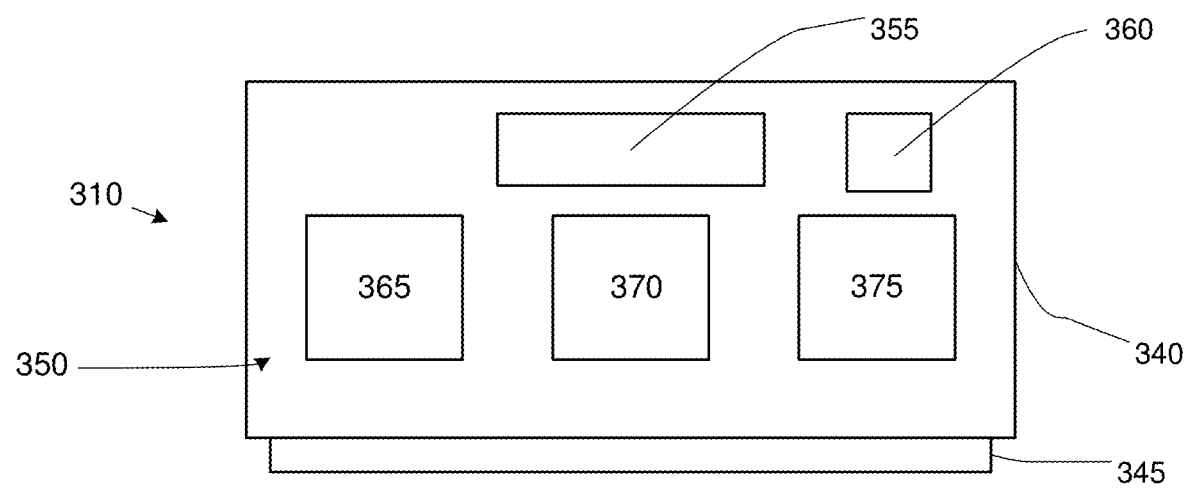
FIG. 4 is a schematic view of an exemplary embodiment of the present invention.

Sensor assembly 310 may be any suitable sensor assembly for sensing any desired properties for use in locating a structural deficiency and/or any desired predetermined condition. As illustrated in FIG. 4, sensor assembly 310 may include a housing 340, an attachment portion 345, a sensor array 350, a communication device 355, and a controller 360. Sensor array 350 and communication device 355 may be housed at least partially or substantially entirely within housing 340. Attachment portion 345 may attach sensor assembly 310 to vehicle 312. Controller 360 may control an operation of components of sensor assembly 310, vehicle 312, and/or other components of system 300. It is also contemplated that sensor assembly 310 may be partially or entirely integrated into vehicle 312.

Housing 340 may be any suitable structural assembly for containing and/or attachment of components of sensor assembly 310. For example, housing 340 may be a structural assembly having any suitable shape (e.g., rectangular prism, cylindrical, cubic, and/or any other suitable shape) and including one or more cavities for containing components of sensor assembly 310. Housing 340 may also be any suitable housing for protecting components of sensor assembly 310 from the elements (e.g., precipitation, wind, exposure to heat and light, and/or any other environmental or manmade effects), sealing interior cavities of housing 340 against the intrusion of debris and/or other undesirable material, and/or protection from intrusion or tampering from unauthorized users, animals, and/or vegetation. Housing 340 (e.g., as well as other components of sensor assembly 310) may be formed from any suitable materials for containing, protecting, and/or sealing components of sensor assembly 310 such as, for example, polymer material, structural metal (e.g., structural steel), co-polymer material, thermoplastic and thermosetting polymers, resin-containing material, polyethylene, polystyrene, polypropylene, epoxy resins, phenolic resins, Acrylanitrile Butadiene Styrene (ABS), Polycarbonate (PC), Mix of ABS and PC, Acetal (POM), Acetate, Acrylic (PMMA), Liquid Crystal Polymer (LCP), Mylar, Polyamid-Nylon, Polyamid-Nylon 6, Polyamid-Nylon 11, Polybutylene Terephthalate (PBT), Polycarbonate (PC), Polyetherimide (PEI), Polyethylene (PE), Low Density PE (LDPE), High Density PE (HDPE), Ultra High Molecular Weight PE (UHMW PE), Polyethylene Terephthalate (PET), PolPolypropylene (PP), Polyphthalamide (PPA), Polyphenylenesulfide (PPS), Polystyrene (PS), High Impact Polystyrene (HIPS), Polysulfone (PSU), Polyurethane (PU), Polyvinyl Chloride (PVC), Chlorinated Polyvinyl chloride (CPVC), Polyvinylidenefluoride (PVDF), Styrene Acrylonitrile (SAN), Teflon TFE, Thermoplastic Elastomer (TPE), Thermoplastic Polyurethane (TPU), and/or Engineered Thermoplastic Polyurethane (ETPU), or any suitable combination thereof.

Attachment portion 345 may be any suitable member, assembly, or device for attaching sensor assembly 310 (e.g., housing 340) to vehicle 312. Attachment portion 345 may attach sensor assembly 310 (e.g., housing 340) to vehicle 312 by any suitable technique. For example, attachment portion 345 may include a threaded attachment device, a bolted attachment device, a snap-fit attachment device, a friction-fit attachment device, an adhesive attachment device, a hook and loop attachment device, a magnetic attachment device, and/or any other suitable mechanical attachment device. For example, attachment portion 345 may include a clamping device to allow sensor assembly 310 to be a clamp-on sensor assembly (e.g., attachment portion 345 clamps around a portion of vehicle 312). Also for example, attachment portion 345 may include magnetic, adhesive, and/or mechanical fastening components that attach housing 340 directly to a surface of vehicle 312. Further for example, attachment portion 345 may include elastic members (e.g., compression and/or tension members) that urge housing 340 to remain in a position adjacent to and/or bearing against an exterior surface of vehicle 312.

Communication device 355 may be any suitable device for communicating data between sensor assembly 310 and any other component of system 300. For example, communication device 355 may include any suitable transceiver device (e.g., transmitter device and/or receiver device) for transmitting data sensed by sensors of sensor array 350 to other components of system 300 (e.g., to detection module 315 via network 301) and also for receiving data from other components of system 300. For example, communication device 355 may receive and transmit data as disclosed below regarding exemplary communication techniques of FIG. 13. For example, communication device 355 may wirelessly transmit data by any suitable technique such as, e.g., wirelessly transmitting data via 4G LTE networks (e.g., or any other suitable data transmission technique for example via network 301). For example, communication device 355 may transmit data collected by sensor array 350 of sensor assembly 310 substantially continuously. For example, communication device 355 may transmit data collected by sensor assembly 310 (e.g., to other components of system 300) several times per second and/or many times per second (e.g., up to 20 times per second and/or up to 50 times per second or more). For example, communication device 355 may wirelessly transmit data collected by sensor assembly 310 (e.g., to other components of system 300) between about 40 and 45 times per second, for example, up to about 42 times per second. For example, controller 360 may control communication device 355 to transmit sensed data collected by sensor array 350 at a frequency of between about one transmission per second and about fifty transmissions per second. Also for example, sensor array 350 may control communication device 355 to transmit (e.g., wirelessly transmit) sensed data collected by sensor array 350 at a frequency of between about ten transmissions per second and about fifty transmissions per second.

Controller 360 may control an operation of sensors of sensor array 350, communication device 355, components of vehicle 312, and/or other components of system 300. Controller 360 may include for example a micro-processing logic control device or board components. Also for example, controller 360 may include input/output arrangements that allow it to be connected (e.g., via wireless and/or electrical connection) to sensors of sensor array 350, communication device 355, detection module 315, and/or user interface 320 (e.g., via network 301 and/or via direct communication). For example, controller 360 may control an operation of sensor assembly 310 based on input received from detection module 315 and/or user interface 320 via communication device 355 and may control a transmission of output from sensors of sensor array 350 via communication device 355. For example, controller 360 may communicate with components of system 300 via wireless communication and/or via electrical lines (e.g., electrical line communication to sensors of sensor array 350 and/or communication device 355). For example, controller 360 may control sensors of sensor array 350 and/or communication device 355 so that sensor assembly 310 acts as an Internet of Things (IoT) device that may provide data to and/or be controlled by system 300 as a data-providing device.

Sensors of sensor array 350 may collect data associated with any desired properties for use in locating a structural deficiency and/or any desired predetermined condition. Sensor array 350 may include one or more sensors such as, for example, a sensor 365, a sensor 370, and a sensor 375. Sensor array 350 may also include additional sensors such as, for example, four, five, ten or more sensors. Sensors of sensor array 350 may sense any suitable condition or characteristic such as, for example, a volatile organic compound (VOC) level, ambient conditions such as pressure and/or temperature, geographic data such as location, an altitude, chemical composition of ambient air, air quality, air pollutants, toxic chemicals, radiation, and/or any other suitable condition or characteristic that may provide data for use by system 300 as described for example herein.

In at least some exemplary embodiments, sensor 365 may be a volatile organic compound (VOC) sensor that may sense a concentration of volatile organic compounds at a location of sensor 365 (e.g., at the location of sensor system 308). For example, when vehicle 312 is an air vehicle, sensor 365 may sense a VOC concentration at a given location and/or altitude or elevation. Sensor 365 may be any suitable type of VOC sensor such as, for example, electrochemical sensors (e.g., potentiometric sensors or amperometric sensors), metal oxide sensors (MOx) or other suitable sensors that operate based on a detected change of conductivity, flame ionization detectors (FID), photo-ionization detectors (PID), optical sensors (e.g., UV portable spectrometers), micro-gas chromatograph (μGC) sensors, and/or any other suitable sensor for detecting a VOC concentration.

In at least some exemplary embodiments, sensor 370 may be a location sensor that measures a geographic location such as, for example, a geo-positioning sensor. For example, sensor 370 may be a global positioning system sensor or any other suitable type of sensor for sensing location with suitable accuracy. For example, location sensor 370 may provide a precise location of sensor assembly 310 of within about 10 feet, within about 5 feet, within about 3 feet (e.g., within about 3½ feet, for example, within 3.6 feet), and/or within about 1 foot.

In at least some exemplary embodiments, sensor 375 may be an ambient pressure, altitude, and/or temperature sensor that may determine an altitude based on a sensed atmospheric pressure and/or a sensed temperature. Sensor 375 may also determine an altitude directly based on, for example, communicating with a global positioning system or other position location system. For example, sensor 375 may include a laser altimeter, lidar, radar, high-frequency microwave radar, ranging device, and/or sounding device. For example, sensor 375 may sense an altitude above sea level (e.g., or any other desired reference point for measuring altitude or elevation). Sensor 375 may include for example a barometer or any other suitable device for sensing a barometric pressure (e.g., ambient pressure). Sensor 375 may include any suitable sensing components such as, for example, a thermocouple, a resistance temperature detector (RTD), a thermistor, and/or a semiconductor-based temperature sensing component. Sensor 375 may for example be any suitable integrated sensor or sub-array of sensors for determining an ambient pressure, an altitude or elevation, and/or an ambient temperature at a location of sensor assembly 310 (e.g., at a location of vehicle 312).

In at least some exemplary embodiments, sensors 365, 370, and/or 375 may be any suitable sensor for detecting a composition of ambient air, including an amount of nitrogen monoxide (NO), nitrogen dioxide (NO2), ozone (O3), sulphur dioxide (SO2), and/or carbon monoxide (CO). Sensors 365, 370, and/or 375 may include a radiometer such as a hyperspectral or imaging radiometer, spectrometer, and/or other suitable sensor for sensing radiation. For example, sensors 365, 370, and/or 375 may include any suitable sensors for sensing portions of the electromagnetic spectrum (e.g., infrared, microwave, and/or visible portions of the electromagnetic spectrum). Sensors 365, 370, and/or 375 may also sense a windspeed, meteorological conditions, and/or applied forces imparted to vehicle 312 by wind and/or ambient air conditions. For example, sensors 365, 370, and/or 375 may include an anemometer, wind vane, and/or any other suitable components for measuring a windspeed or force imparted by wind or air conditions.

Although the exemplary illustration of FIG. 4 illustrates three different sensors 365, 370, and 375, sensor array 350 may include any number of sensors that may measure multiple properties. For example, a single sensor may measure any number of properties and may therefore serve as one or more of sensors 365, 370, and 375 (e.g., one or more of sensors 365, 370, and 375 may be the same sensor).

Returning to FIG. 1, detection module 315 may communicate with other components of system 300 via network 301 (e.g., as disclosed below regarding FIG. 13). Detection module 315 may also be partially or substantially entirely integrated with one or more components of system 300 such as, for example, network 301, user interface 320, and/or one or more sensor assemblies 310. Detection module 315 may include components similar to the exemplary components disclosed below regarding FIGS. 12 and 13. For example, detection module 315 may include computer-executable code stored in non-volatile memory. Detection module 315 may also include a processor, or alternatively, a processor for processing data associated with system 300 may be partially or substantially entirely integrated into any portion (e.g., or combination of portions) of system 300 (e.g., network 301, detection module 315, user interface 320, and/or one or more sensor assemblies 310).

Detection module 315 may be configured to retrieve, store, process, and/or analyze data transmitted from one or more sensor assemblies 310 to detection module 315. For example, detection module 315 may operate using data from any desired number of sensor assemblies 310 such as, for example, one, two, several, dozens, or more sensor assemblies 310.

Detection module 315 may perform analysis and direct an operation of system 300 using the data received from sensor assemblies 310 as described for example below. Also for example, detection module 315 may utilize sophisticated machine learning and/or artificial intelligence techniques to perform predictive analysis using some or substantially all data collected by sensor assemblies 310. For example, system 300 (e.g., detection module 315) may for example utilize the collected data to prepare and submit (e.g., via network 301, for example via wireless transmission such as via 4G LTE networks) datasets and variables to cloud computing clusters and/or other analytical tools (e.g., predictive analytical tools) which may analyze such data using artificial intelligence neural networks. Detection module 315 may for example include cloud computing clusters performing predictive analysis. For example, detection module 315 may utilize neural network-based artificial intelligence to predictively assess risk (e.g., based on continuously collected data transmitted from sensor assemblies 310). For example, the exemplary neural network may include a plurality of input nodes that may be interconnected and/or networked with a plurality of additional and/or other processing nodes to determine a predicted result (e.g., a location as described for example herein).

For example, exemplary artificial intelligence processes may include filtering and processing datasets, processing to simplify datasets by statistically eliminating irrelevant, invariant or superfluous variables or creating new variables which are an amalgamation of a set of underlying variables, and/or processing for splitting datasets into train, test and validate datasets using at least a stratified sampling technique. For example, exemplary artificial intelligence processes may also include processing to determine a precise location of a structural deficiency and/or predetermined condition as described for example herein. For example, the prediction algorithms and approach may include regression models, tree-based approaches, logistic regression, Bayesian methods, deep-learning and neural networks both as a standalone and on an ensemble basis, and final prediction may be based on the model/structure which delivers the highest degree of accuracy and stability as judged by implementation against the test and validate datasets. Also for example, exemplary artificial intelligence processes may include processing for training a machine learning model to make predictions based on data collected by sensor assemblies 310. Exemplary artificial intelligence processes of system 300 may include using data (e.g., such as VOC, location, altitude, and/or ambient condition data) collected by one or more sensor assemblies 310 to pinpoint locations of structural deficiencies and/or predetermined conditions. For example, system 300 (e.g., detection module 315) may utilize continuously collected data from sensor assemblies 310, which may include thousands, millions, and/or billions of data points, to perform predictive analysis using artificial intelligence and/or machine learning.

Figure 5:
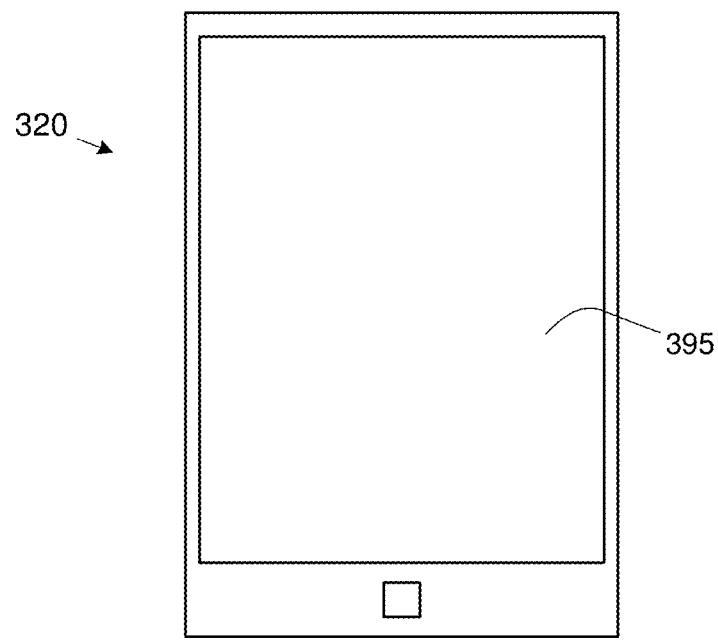
FIG. 5 is a schematic view of an exemplary embodiment of the present invention.

User interface 320 may be any suitable user interface for receiving input and/or providing output (e.g., raw data and/or results of predictive analysis described above) to a user. User interface 320 may be a touchscreen device (e.g., of a smartphone, a tablet, a smartboard, and/or any suitable computer device), a computer keyboard and monitor (e.g., desktop or laptop), an audio-based device for entering input and/or receiving output via sound, a tactile-based device for entering input and receiving output based on touch or feel, a dedicated user interface designed to work specifically with other components of system 300, and/or any other suitable user interface. For example, user interface 320 may include a touchscreen device of a smartphone or handheld tablet. For example as illustrated in FIG. 5, user interface 320 may include a display 395 (e.g., a computing device display, a touchscreen display, and/or any other suitable type of display) that may provide raw data and/or predictive analysis results to a user. For example, display 395 may include a graphical user interface to facilitate entry of input by a user and/or receiving output. For example, a user may utilize user interface 320 to query raw data results and/or enter parameters to define a set of desired output (e.g., precise location data of one or more structural deficiencies and/or predetermined conditions). Also for example, system 300 may provide alerts to a user via output transmitted to user interface 320 (e.g., alerts pushed to a user via user interface 320) for example if a location of a structural deficiency and/or predetermined condition is determined. System 300 may also send such alerts by alternative methods such as, for example, via text message, email, and/or recording sent by telephone.

The exemplary disclosed apparatus, system, and method may be used in any suitable application for determining a location. For example, the exemplary disclosed apparatus, system, and method may be used to determine a location of a structural deficiency or a predetermined condition. For example, the exemplary disclosed apparatus, system, and method may be used to detect and locate a leak, spill, change in ambient conditions, and/or any other suitable predetermined criteria. The exemplary disclosed apparatus, system, and method may be used to detect a precise location of a structural deficiency or predetermined condition on any suitable structure such as, for example, a pipeline, an industrial, commercial, or residential area, an oil refinery, a chemical processing and/or storage complex, an airport or seaport area, a city, and/or any other desired area. The exemplary disclosed apparatus, system, and method may be used to determine a location of a predetermined criteria (e.g., a leak, a spill, a change in ambient conditions, and/or any other suitable predetermined criteria) in any desired area.

Figure 6:
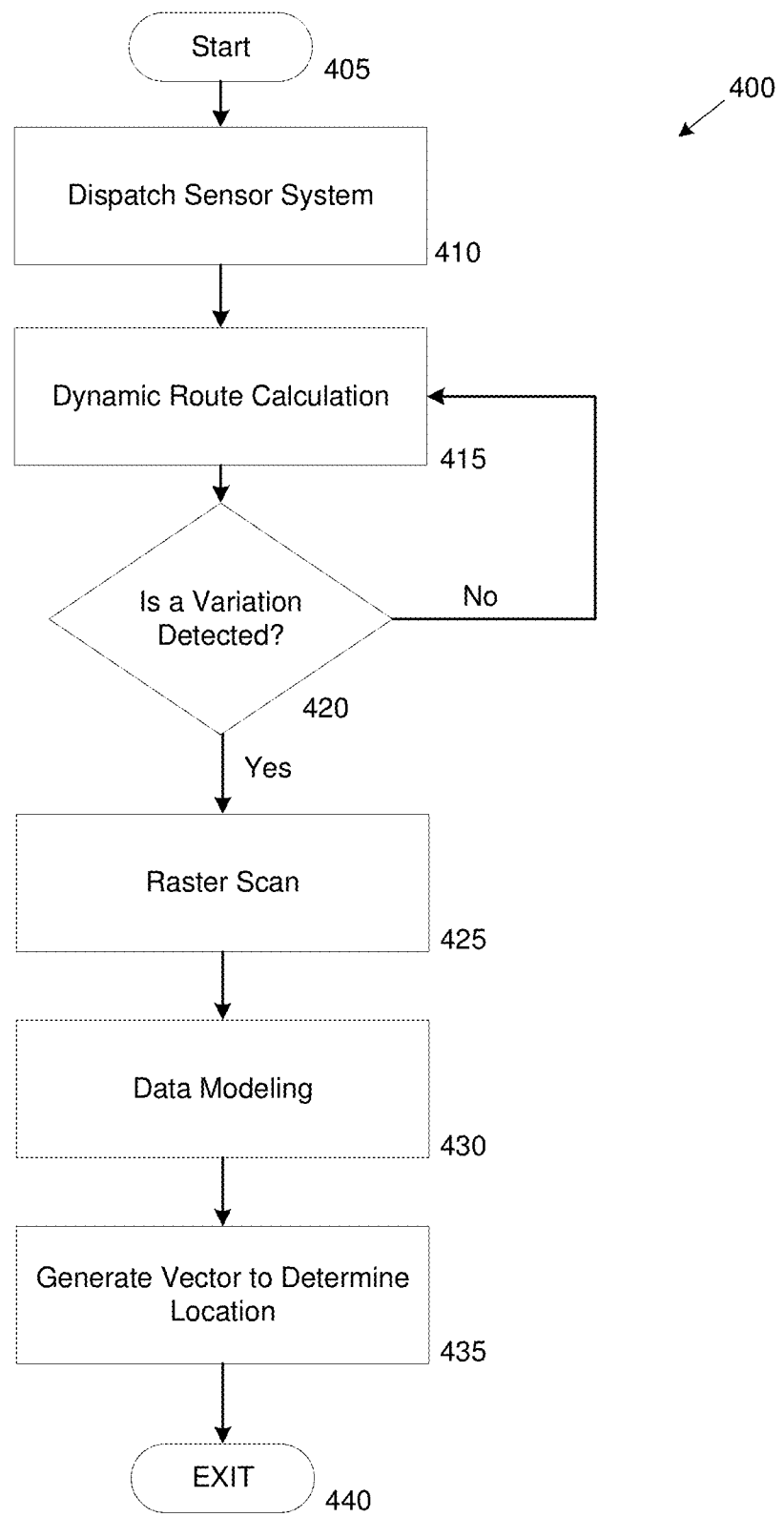
FIG. 6 illustrates an exemplary process of an exemplary embodiment of the present invention.

An exemplary operation of the exemplary disclosed apparatus, system, and method will now be described. For example, FIG. 6 illustrates an exemplary process 400. Process 400 starts at step 405. At step 410, system 300 may dispatch sensor system 308. In at least some exemplary embodiments, vehicle 312 that may carry sensor assembly 310 may be dispatched to an estimated location of a structural deficiency or predetermined condition of an exemplary system (e.g., passage system 305 or system 338). The estimated location may be estimated based on any suitable technique such as, for example, a remote monitoring system, reporting (e.g., eyewitness accounts, reports provided by emergency personnel or the public, and/or 911 calls), detection by nearby systems (e.g., imaging systems, security systems, and/or any other nearby systems that may provide estimated locations of structural deficiencies and/or predetermined conditions), satellite-based detection systems, and/or any other source of information that may be provided to system 300 regarding an estimated location of structural deficiencies and/or predetermined conditions. System 300 may direct sensor system 308 to move to the estimated location for example based on data provided by location sensor 370.

At step 415, system 300 may dynamically calculate and adjust a travel route of sensor system 308. For example, system 300 may modulate (e.g., modify or control) a route of sensor system 308 based on criteria such as meteorological data, data regarding ambient conditions, and/or any other suitable data provided to system 300. For example, system 300 may use artificial intelligence processes (e.g., as described herein) to control sensor system 308 to use smart movement patterns to perform scanning operations (e.g., perform raster scans to develop profiles such as concentration profiles as described herein). In at least some exemplary conditions, system 300 may modulate the travel route of sensor system 308, including controlling a speed, vector of travel, and altitude, based on any exemplary data sensed by sensor array 350 as described for example herein. System 300 may for example continuously modulate a travel route (e.g., flight plan) of sensor system 308 in real-time based on real-time or near real-time data sensed by sensor array 350 and provided to system 300.

At step 420, system 300 may determine whether or not a variation has been detected by sensor array 350. For example, based on data sensed by sensor array 350 and provided to and processed by system 300, system 300 may determine whether or not a variation that may be indicative of a structural deficiency and/or a predetermined condition has been detected. The exemplary variation may be detected based on data sensed by sensor array 350 falling within a predetermined range or other predetermined criteria. In at least some exemplary embodiments, system 300 may determine that a variation exists based on VOC sensor 365 sensing a VOC concentration of ambient air at or near a location of sensor system 308 that falls within a predetermined range and/or exceeds a predetermined threshold value. Any other suitable range or threshold of sensed data may also indicate a variation is detected, such as a predetermined range or threshold of a characteristic of ambient air that may be sensed by sensor array 350 as described for example above. If an exemplary variation is detected, system 300 may proceed to step 425 below. If an exemplary variation is not detected, system 300 may return to step 415 and continue to perform the dynamic route calculation and to modulate a travel route of sensor system 308.

Figure 7:
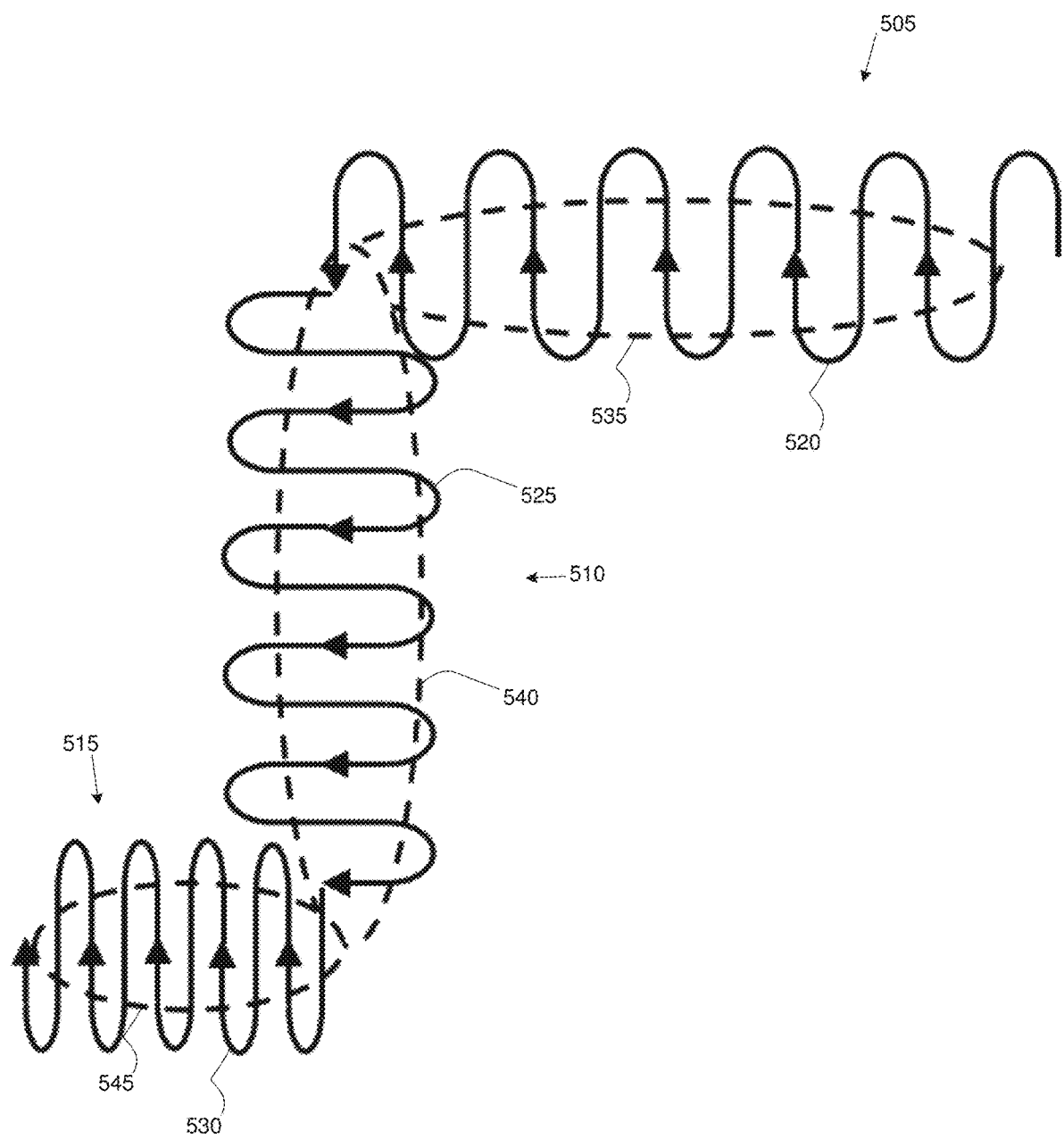
FIG. 7 is a schematic view of an exemplary embodiment of the present invention.

At step 425, system 300 may control sensor system 308 to perform a scan. The scan may be any suitable scan of air (e.g., or other material such as water) such as a raster scan (e.g., raster scanning motion). For example as illustrated in FIG. 7, sensor system 308 may perform a raster scan that may include a plurality of planar scans. For example, sensor system 308 may travel within a substantially 2-dimensional plane (2D plane) to perform a planar scan (e.g., planar raster scan). Vehicle 312 carrying sensor assembly 310 may travel back and forth or in any other desired pattern within the same plane (e.g., within a substantially flat plane thereby performing a planar movement). Sensor system 308 may for example perform a plurality of raster scans, each in a different plane. For example, sensor system 308 may travel back and forth or in any other suitable pattern within a plane 505, a plane 510, and/or a plane 515. Sensor system 308 may travel in any suitable number of planes such as two, three, four, or more planes. The exemplary planes may each be different from each other. For example, planes 505, 510, and 515 may each be defined by unique three-dimensional points. The exemplary planes may be horizontal, vertical, or diagonal planes relative to sea level (e.g., a plane of a relatively flat terrain over a distance at which the earth's curvature is negligible) or any other desired reference plane. Sensor system 308 may for example travel in plane 505 (e.g., a first horizontal plane or any other desired plane), plane 510 (e.g., a vertical plane or any other desired plane that is different from plane 505), and plane 515 (e.g., a second horizontal plane or any other desired plane that is different from planes 505 and 510).

In at least some exemplary embodiments, sensor system 308 may travel in a substantially flat travel plan 520 (e.g., substantially 2D travel plan) that lies in plane 505, a substantially flat travel plan 525 (e.g., substantially 2D travel plan) that lies in plane 510, and a substantially flat travel plan 530 (e.g., substantially 2D travel plan) that lies in plane 515. As described further below, in addition to travel plan 520, a shape 535 may also lie in plane 505. Also as described further below, in addition to travel plan 525, a shape 540 may also lie in plane 510. Additionally as described further below, in addition to travel plan 530, a shape 545 may also lie in plane 515.

In at least some exemplary embodiments, sensor system 308 may perform a scan (e.g., raster scan) that includes a plurality of planar portions. For example, the exemplary scan may include a first planar portion that may include travel plan 520 that is disposed in plane 505 (e.g., along with shape 535), a second planar portion that may include travel plan 525 that is disposed in plane 510 (e.g., along with shape 540), and a third planar portion that may include travel plan 530 that is disposed in plane 515 (e.g., along with shape 545). Sensor system 308 may use sensor array 350 to sense data as described for example above as it travels along travel plans 520, 525, and 530. Sensor system 308 may thereby sense data of air (e.g., or water or other material) disposed at or near planes 505, 510, and 515.

Returning to FIG. 6, system 300 may perform data modeling at step 430 using data sensed by sensor system 308 during step 425. The data modeling of step 430 may occur partially or entirely concurrently with the scanning of step 425. System 300 may adjust the scanning operation at step 425 based on the data modeling at step 430 (e.g., if obtaining additional sensed data is appropriate based on the data modeling of step 430).

Figure 8:
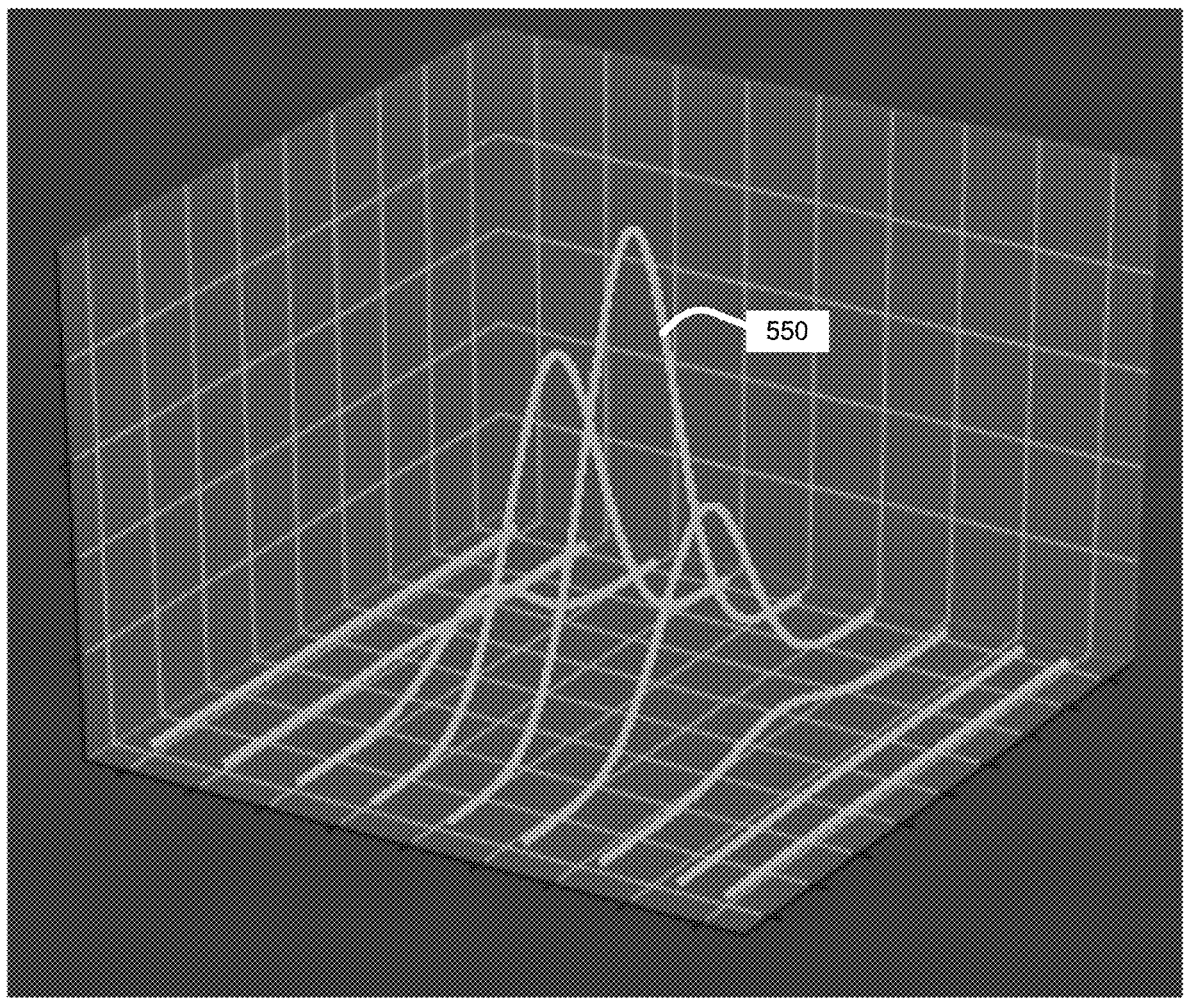
FIG. 8 is a schematic view of an exemplary embodiment of the present invention.
Figure 9:
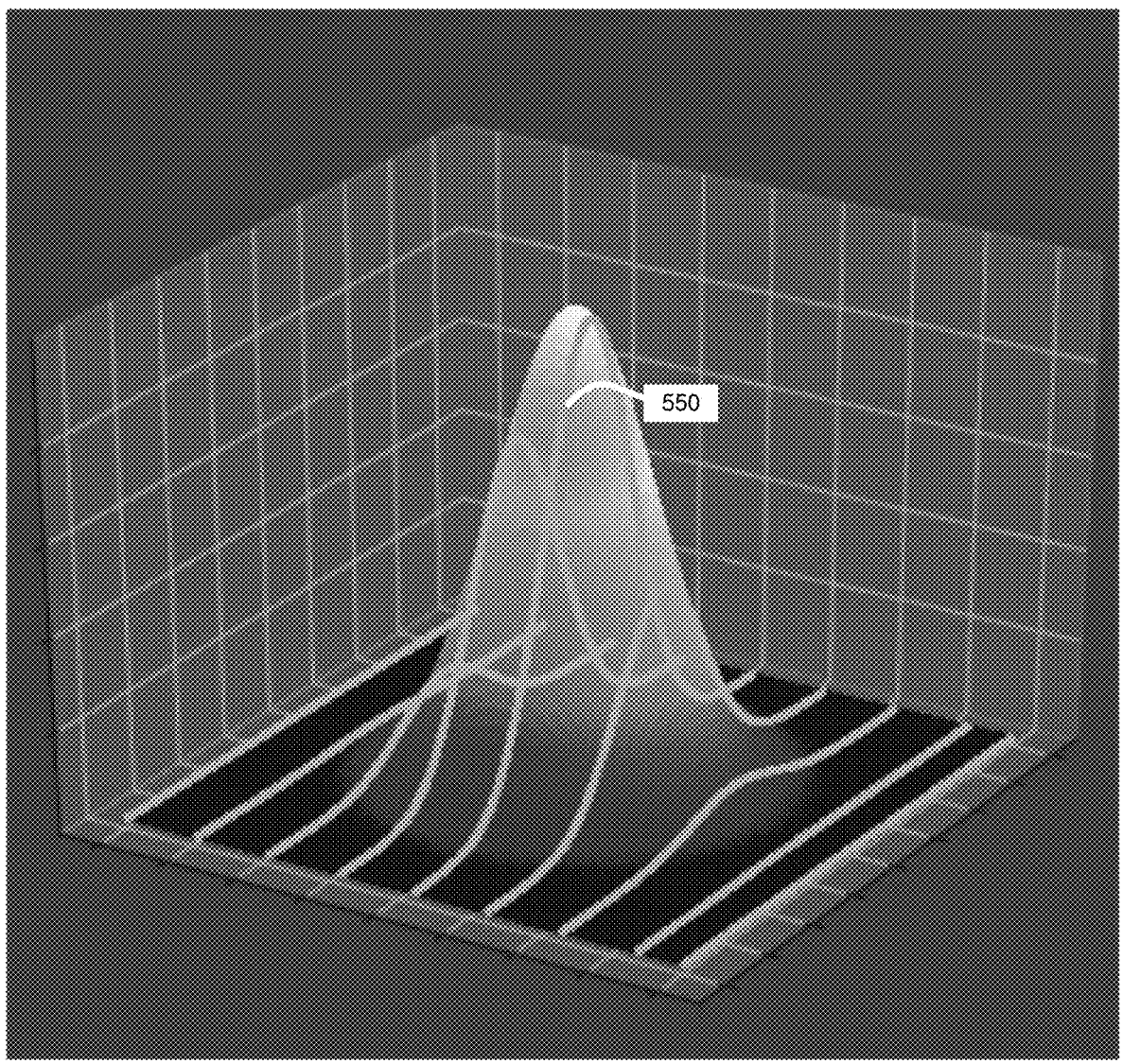
FIG. 9 is a schematic view of an exemplary embodiment of the present invention.
Figure 10:
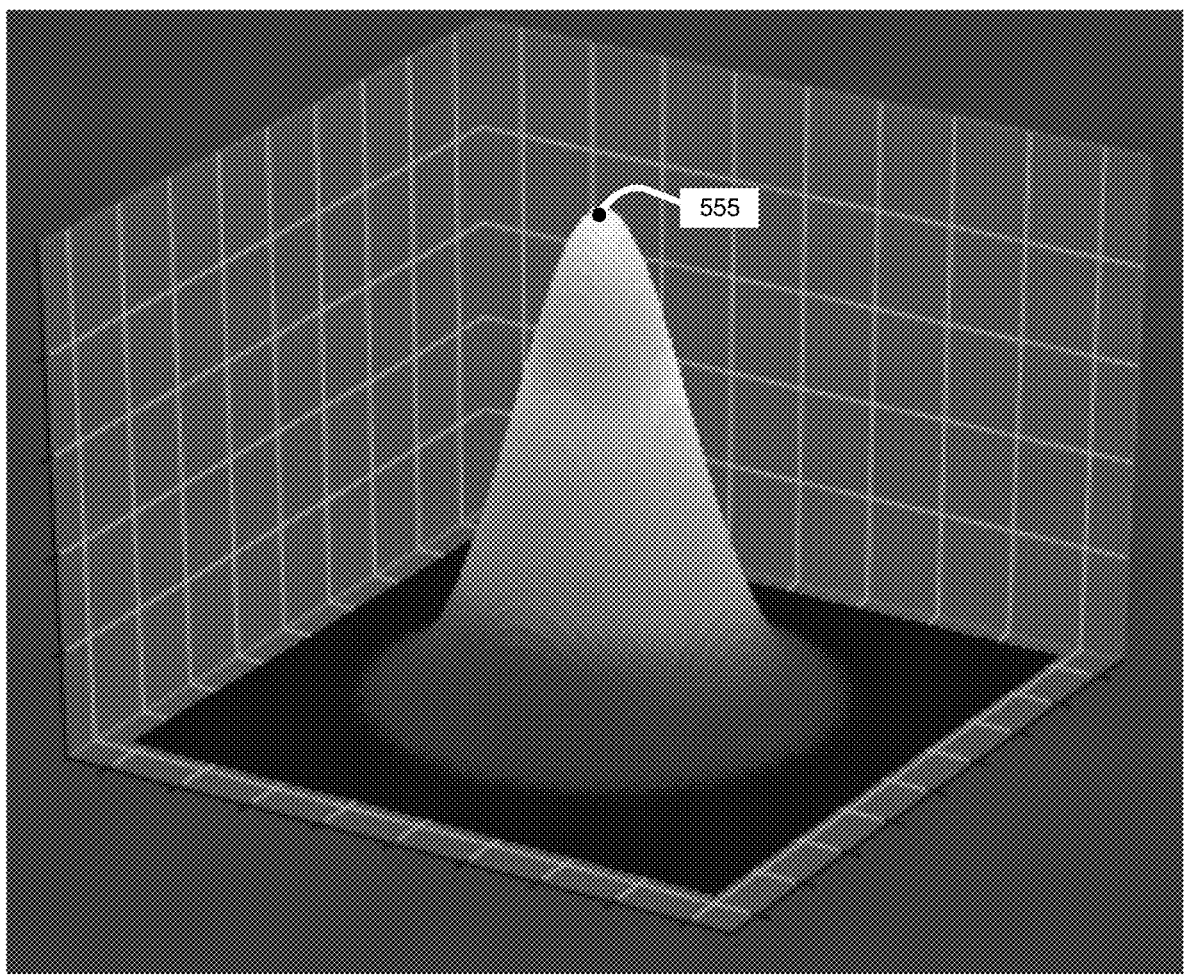
FIG. 10 is a schematic view of an exemplary embodiment of the present invention.

System 300 may use the data obtained during step 425 to generate a model as illustrated for example in FIGS. 8-10. The model may be any suitable model for using data based on the data collection (e.g., raster scan) of step 425 such as, for example, a model using gaussian curves. For example, the model may include gaussian-like curves. In at least some exemplary embodiments, the model created by system 300 at step 430 may be a juxtaposition of gaussian curves.

In at least some exemplary embodiments and as illustrated in FIG. 8, a plurality of gaussian curves 550 may be generated by system 300 at step 430 using the data collected at step 425. For example, data sensed by sensor system 308 while traveling on travel plan 520 in plane 505 may be used to generate a plurality of gaussian curves 550 as illustrated in FIG. 8. For example, the 2D raster scan of travel plan 520 may be used to generate the plurality of gaussian curves 550 that may be a set of slices of data. For example, data sensed at step 425 may be fit based on three moments of a probability curve (e.g., gaussian curve) such as, for example mean, variance, and skewness. For example, each curve (e.g., gaussian curve 550) may be fit to a first moment (e.g., mean), a second moment (e.g., variance), and a third moment (e.g., skewness). Although gaussian curve 550 is illustrated as an example, any suitable distribution (e.g., probability distribution) may be used by system 300. In at least some exemplary embodiments, the plurality of gaussian curves 550 may be a set of VOC concentration slices based on VOC concentration data sensed by sensor 365 that may be a VOC sensor. The plurality of gaussian curves 550 may be based on any data sensed by sensor array 350 as described for example herein. A plurality of gaussian curves similar to as illustrated in FIG. 8 (e.g., gaussian curves 550) may be generated for each of travel plan 520 disposed in plane 505, travel plan 525 disposed in plane 510, and travel plan 530 disposed in plan 515. For example, a plurality of gaussian curves may be generated for each exemplary raster scan performed in each plane as described above. For example, three pluralities of gaussian curves similar to as illustrated in FIG. 8 may be generated based on the three planar raster scans illustrated in FIG. 7.

In at least some exemplary embodiments, the plurality of gaussian curves 550 may model a VOC concentration sensed by sensor system 308 above or in the vicinity of passage system 305 or system 338. For example, sensor system 308 may perform a plurality of planar raster scans while sensing a VOC concentration (e.g., or any other sensed data) using sensor array 350 as described for example herein. As illustrated in FIG. 9, the plurality of gaussian curves 550 representing 2D slices may be used (e.g., reconstructed) to provide 3D information such as, for example, a VOC concentration in 3-dimensional space. System 300 may similarly provide 3D information regarding any data sensed by sensor array 350 as described for example herein. As illustrated in FIG. 10, system 300 may use the sensed data to develop a final VOC concentration profile (e.g., or a final profile of any other data sensed by sensor array 350 in a similar manner as described for the example of VOC set forth herein).

In at least some exemplary embodiments, a plurality of final profiles similar to FIG. 10 may be developed for each of a plurality of planar raster scans. For example, three final profiles similar to FIG. 10 may be developed based on the plurality of planar raster scans. In at least some exemplary embodiments, a first final VOC concentration profile based on travel plan 520 of plane 505, a second final VOC concentration profile based on travel plan 525 of plane 510, and third final VOC concentration profile based on travel plan 530 of plane 515 may be developed by system 300 (e.g., or final profiles based on any other data sensed by sensor array 350). As described below, shapes 535, 540, and 545 may include data from or be derived from the exemplary final profiles (e.g., shapes 535, 540, and 545 may be representative of the data of the final profiles developed from the exemplary distributions described above such as gaussian curves). Each exemplary final profile may have a portion (e.g., portion 555) that may be a maximum, minimum, peak, or any other suitable portion having a desired criteria for use by system 300. For example, portion 555 may be a peak VOC concentration determined by the model generated by system 300 based on VOC data sensed by sensor array 350.

Returning to FIG. 6, system 300 may determine a location of a structural deficiency or any desired predetermined condition at step 435. Step 435 may for example occur once the data modeling of step 430 is substantially complete. It is also contemplated that step 435 may occur partially or entirely concurrently with the data modeling of step 430 and/or the scanning of step 425. System 300 may adjust the location determination operation at step 435 based on the data modeling at step 430 and/or the scanning operation at step 425.

Figure 11:
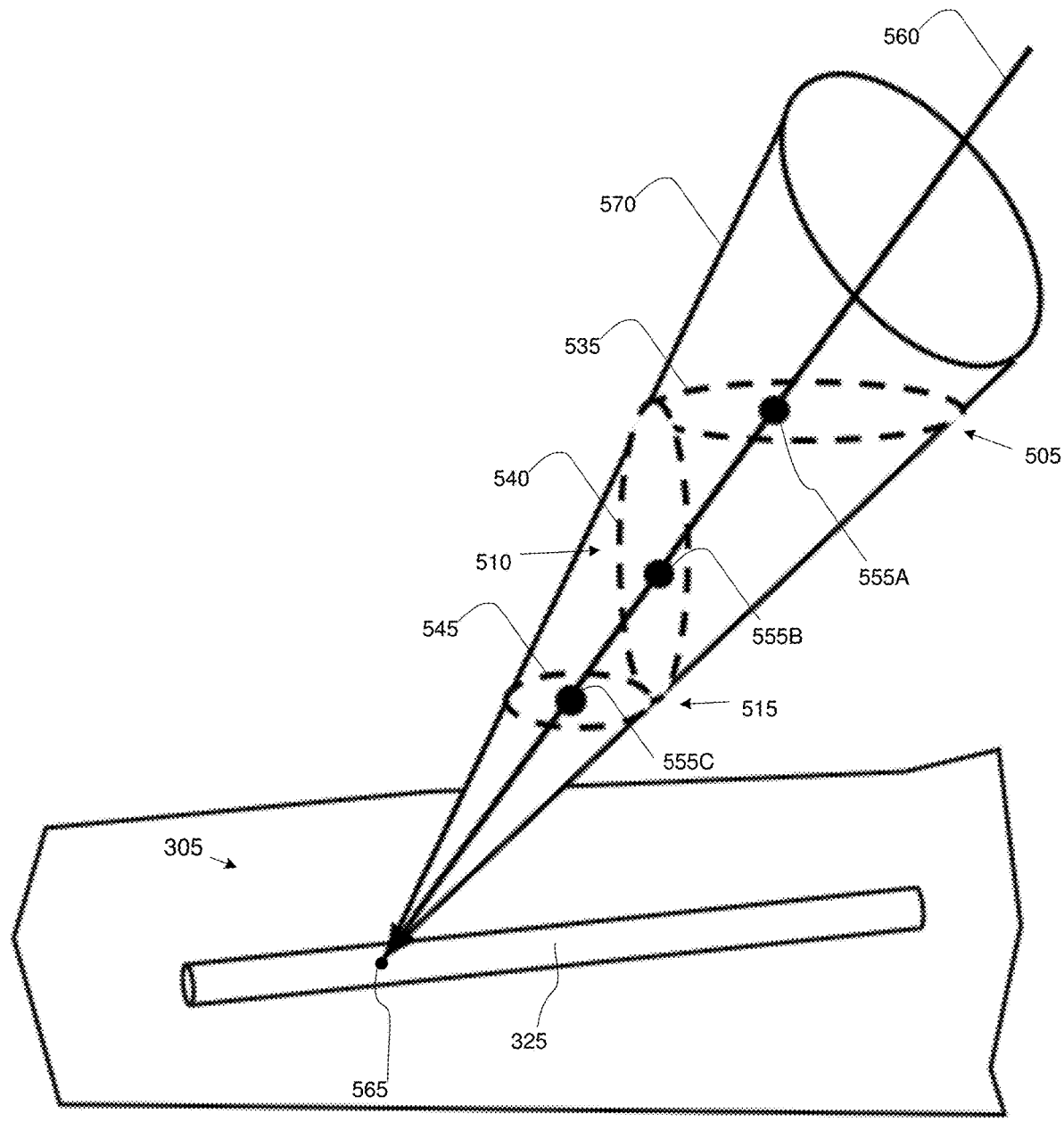
FIG. 11 is a schematic view of an exemplary embodiment of the present invention.

As illustrated in FIG. 11, a four-dimensional (4D) graph may be generated based on the final profiles developed from the exemplary gaussian curves described above (e.g., as illustrated in FIGS. 8-10). The 4D graph may include data levels (e.g., VOC concentration or other data sensed by sensor system 308) displayed at 3D locations. As described above regarding FIGS. 7-10 and as illustrated in FIG. 11, a final profile based on travel plan 520 may be located in plane 505. The final profile located in plane 505 may include some or substantially all of shape 535. In at least some exemplary embodiments, the final profile located in plane 505 may have the same shape as shape 535. Similar to as described above regarding portion 555, the final profile located in plane 505 may have a portion 555A that may be a maximum, minimum, peak, or any other suitable portion having a desired criteria for use by system 300. For example, portion 555A may be a peak VOC concentration of the final profile developed based on data sensed by sensor system 308 during the raster scan of travel plan 520. Portion 555A may for example be a VOC concentration hotspot located in plane 505.

As described above regarding FIGS. 7-10 and as illustrated in FIG. 11, a final profile based on travel plan 525 may be located in plane 510. The final profile located in plane 510 may include some or substantially all of shape 540. In at least some exemplary embodiments, the final profile located in plane 510 may have the same shape as shape 540. Similar to as described above regarding portion 555, the final profile located in plane 510 may have a portion 555B that may be a maximum, minimum, peak, or any other suitable portion having a desired criteria for use by system 300. For example, portion 555B may be a peak VOC concentration of the final profile developed based on data sensed by sensor system 308 during the raster scan of travel plan 525. Portion 555B may for example be a VOC concentration hotspot located in plane 510.

As described above regarding FIGS. 7-10 and as illustrated in FIG. 11, a final profile based on travel plan 530 may be located in plane 515. The final profile located in plane 515 may include some or substantially all of shape 545. In at least some exemplary embodiments, the final profile located in plane 515 may have the same shape as shape 545. Similar to as described above regarding portion 555, the final profile located in plane 515 may have a portion 555C that may be a maximum, minimum, peak, or any other suitable portion having a desired criteria for use by system 300. For example, portion 555C may be a peak VOC concentration of the final profile developed based on data sensed by sensor system 308 during the raster scan of travel plan 530. Portion 555C may for example be a VOC concentration hotspot located in plane 515.

FIG. 11 may thereby illustrate an exemplary 4D graph showing 3D locations of data sensed by sensor array 350 of sensor system 308. In at least some exemplary embodiments, FIG. 11 may illustrate VOC concentrations at 3D points. Shapes 535, 540, and 545 may be planar shapes defined by boundaries of a cone 570 that passes through planes 505, 510, and 515. System 300 may determine a location 565 of a structural deficiency or predetermined condition based on generating a vector 560 that passes through portions 555A, 555B, and 555C. For example when portions 555A, 555B, and 555C are hotspots (e.g., VOC concentration hotspots), vector 560 may spear through a middle portion or central portion of each of portions 555A, 555B, and 555C. As illustrated in FIG. 11, vector 560 may pass through portions 555A, 555B, and 555C and also location 565 of an exemplary system (e.g., passage system 305 or system 338). A precise location 565 may thereby be identified by vector 560. For example, vector 560 may point to and/or pass through location 565.

During operation, system 300 may make adjustments to the exemplary process described above to account for the effect of wind. For example, wind may act on sensor system 308 and/or sensor system 308 may create its own wind current. System 300 may use computational fluid dynamics to process a flow field based on live meteorological data sensed by sensor array 350 and/or provided to system 300 by any suitable source. For example, sensor system 308 (e.g., sensor assembly 310 and/or vehicle 312) may be modeled. Current created by sensor system 308 may be modeled as falling within a turbulent flow regime. It is also contemplated that system 300 may similarly account for current flows if system 300 is operating in water.

In at least some exemplary embodiments, an exemplary disclosed method may include providing a sensor (e.g., one or more sensors of sensor array 350) attached to a vehicle (e.g., vehicle 312), controlling the vehicle to move toward a system (e.g., passage system 305 or system 338), using the sensor to sense data, providing the sensed data to a detection module including computer-executable code stored in non-volatile memory, controlling the sensor and the vehicle to perform a raster scan when the detection module detects a variation in the sensed data, providing sensed raster scan data to the detection module, using the detection module to generate a plurality of probability distribution curves based on the sensed raster scan data, and using the detection module to generate a vector based on the plurality of probability distribution curves. The vector may point to or pass through a location of the system. The sensor attached to the vehicle may be a VOC sensor attached to a drone. The location of the system may be a leak location of an oil and gas pipeline system. Controlling the sensor and the vehicle to perform a raster scan may include controlling the sensor and the vehicle to perform a plurality of planar raster scans. The plurality of planar raster scans may include a first planar raster scan performed in a first plane (e.g., plane 505), a second planar raster scan performed in a second plane (e.g., plane 510) that is different from the first plane, and a third planar raster scan that is performed in a third plane (e.g., plane 515) that is different from the first plane and from the second plane. Performing the plurality of planar raster scans may include moving the vehicle back and forth within a plurality of substantially flat two-dimensional planes. Generating the plurality of probability distribution curves may include generating a plurality of juxtaposed gaussian curves, each of the juxtaposed gaussian curved including a hotspot based on the sensed raster scan data. The hotspot may be a maximum VOC concentration. The sensor may be a sensor array including a VOC sensor, a geographic location sensor, and an altitude sensor.

In at least some exemplary embodiments, an exemplary disclosed detection system may include a detection module, comprising computer-executable code stored in non-volatile memory, a processor, and a VOC sensor (e.g., one or more sensors of sensor array 350) attached to a vehicle (e.g., vehicle 312). The detection module, the processor, and the VOC sensor attached to the vehicle may be configured to control the vehicle to move toward a system (e.g., passage system 305 or system 338), use the VOC sensor to sense VOC data, control the VOC sensor and the vehicle to perform a planar scan when the detection module detects a variation in the sensed VOC data, sense planar scan VOC data during the planar scan, generate a plurality of gaussian curves based on the sensed planar scan VOC data, and generate a vector based on the plurality of gaussian curves. The vector may point to or pass through a location of the system. The vehicle may be a drone and the location of the system is a structural deficiency location of a pipeline. The planar scan may include a first planar raster scan in which the vehicle moves back and forth in a first plane (e.g., plane 505), a second planar raster scan in which the vehicle moves back and forth in a second plane (e.g., plane 510) that is different from the first plane, and a third planar raster scan in which the vehicle moves back and forth in a third plane (e.g., plane 515) that is different from the first plane and from the second plane. The plurality of gaussian curves may include a first juxtaposition of gaussian curves based on sensed planar scan VOC data sensed during the first planar raster scan, a second juxtaposition of gaussian curves based on sensed planar scan VOC data sensed during the second planar raster scan, and a third juxtaposition of gaussian curves based on sensed planar scan VOC data sensed during the third planar raster scan. Generating the vector may include spearing the vector through a first VOC maximum concentration defined by the first juxtaposition of gaussian curves, a second VOC maximum concentration defined by the second juxtaposition of gaussian curves, and a third VOC maximum concentration defined by the third juxtaposition of gaussian curves. The VOC sensor attached to the vehicle may be a VOC sensor attached to a drone, the system may be an oil and gas pipeline, and the planar scan may be a plurality of planar two-dimensional raster scans that the VOC sensor attached to the drone flies above the oil and gas pipeline.

In at least some exemplary embodiments, an exemplary disclosed method may include providing a sensor array (e.g., sensor array 350) including a VOC sensor (e.g., sensor 365) attached to an aerial drone, controlling the aerial drone to move toward a pipeline system (e.g., passage system 305), using the VOC sensor to sense VOC data, providing the sensed VOC data to a detection module including computer-executable code stored in non-volatile memory, controlling the VOC sensor and the aerial drone to perform a raster scan when the detection module detects a variation in the sensed VOC data, providing sensed raster scan VOC data to the detection module, using the detection module to generate a plurality of gaussian curves based on the sensed raster scan VOC data, and using the detection module to generate a vector based on the plurality of gaussian curves. The vector may point to a location of the pipeline system. The raster scan may include a first planar raster scan in which the aerial drone moves back and forth in a first plane (e.g., plane 505), a second planar raster scan in which the aerial drone moves back and forth in a second plane (e.g., plane 510) that may be different from the first plane, and a third planar raster scan in which the aerial drone moves back and forth in a third plane (e.g., plane 515) that may be different from the first plane and from the second plane. The first plane may be a first substantially vertical plane, the second plane may be a substantially horizontal plane, and the third plane may be a second substantially vertical plane. The plurality of gaussian curves may include a first juxtaposition of gaussian curves based on sensed raster scan VOC data sensed during the first planar raster scan, a second juxtaposition of gaussian curves based on sensed raster scan VOC data sensed during the second planar raster scan, and a third juxtaposition of gaussian curves based on sensed raster scan VOC data sensed during the third planar raster scan. Generating the vector may include spearing the vector through a first VOC maximum concentration defined by the first juxtaposition of gaussian curves, a second VOC maximum concentration defined by the second juxtaposition of gaussian curves, and a third VOC maximum concentration defined by the third juxtaposition of gaussian curves.

In at least some exemplary embodiments, system 300 may be a deployable drone-based gas sensing system. For example, system 300 may be a drone-based gas "sniffing" system that may determine precise location of leaks of systems such as passage system 305 and/or system 338. For example, system 300 may include a drone that is dispatched along a pipeline (e.g., an oil and gas pipeline). As described for example above, system 300 may use gaussian-like profiles to deduce a source of a leak.

The exemplary disclosed apparatus, system, and method may provide an effective technique for quickly and precisely determining a location of a structural deficiency or predetermined conditions. The exemplary disclosed apparatus, system, and method may allow a location of a deficiency or other predetermined conditions on a structure (e.g., a relatively large structure) to be precisely located in a relatively short period of time. For example, the exemplary disclosed apparatus, system, and method may provide a technique for quickly pinpointing a structural deficiency or other predetermined condition on a large or long structure, thereby avoiding a time-intensive inspection of an entire area to determine a location of the structural deficiency or other predetermined condition.

Figure 12:
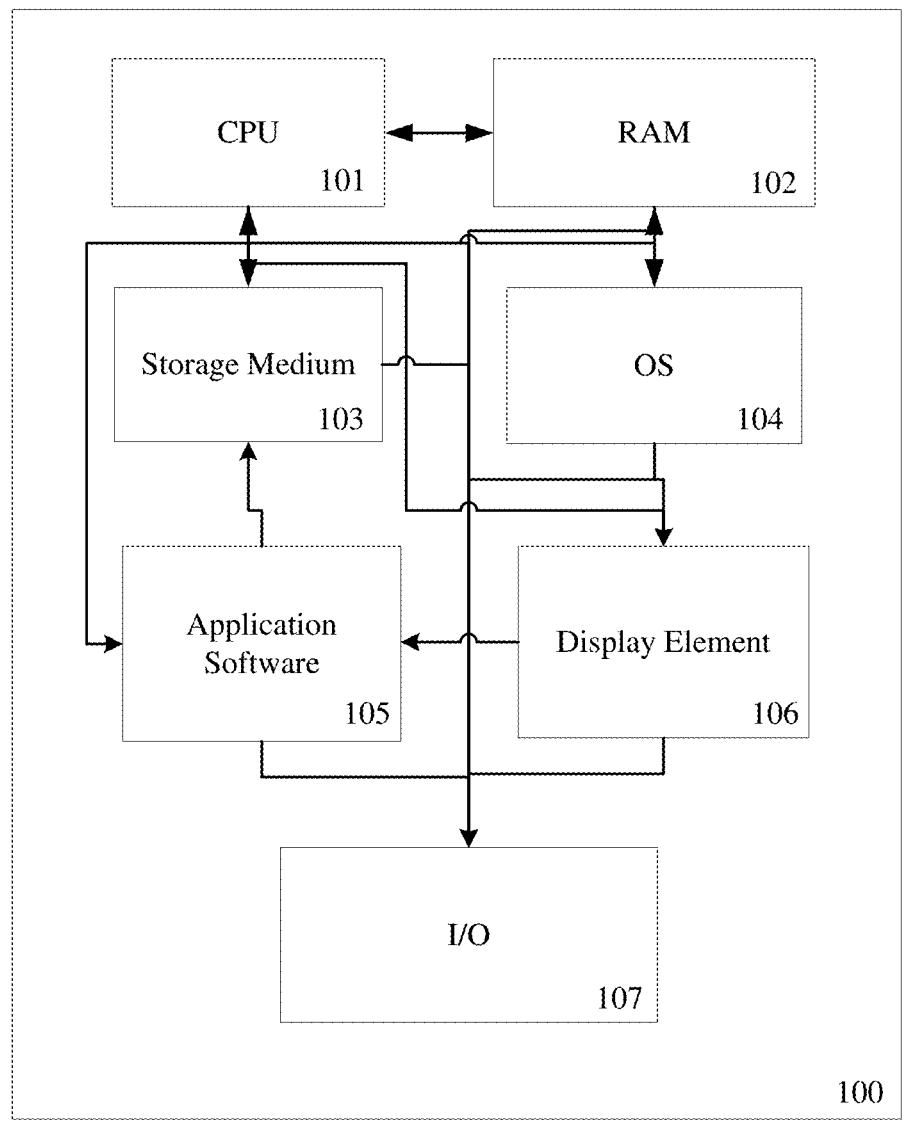
FIG. 12 is a schematic illustration of an exemplary computing device, in accordance with at least some exemplary embodiments of the present disclosure.

An illustrative representation of a computing device appropriate for use with embodiments of the system of the present disclosure is shown in FIG. 12. The computing device 100 can generally be comprised of a Central Processing Unit (CPU, 101), optional further processing units including a graphics processing unit (GPU), a Random Access Memory (RAM, 102), a mother board 103, or alternatively/additionally a storage medium (e.g., hard disk drive, solid state drive, flash memory, cloud storage), an operating system (OS, 104), one or more application software 105, a display element 106, and one or more input/output devices/means 107, including one or more communication interfaces (e.g., RS232, Ethernet, Wifi, Bluetooth, USB). Useful examples include, but are not limited to, personal computers, smart phones, laptops, mobile computing devices, tablet PCs, touch boards, and servers. Multiple computing devices can be operably linked to form a computer network in a manner as to distribute and share one or more resources, such as clustered computing devices and server banks/farms.

Various examples of such general-purpose multi-unit computer networks suitable for embodiments of the disclosure, their typical configuration and many standardized communication links are well known to one skilled in the art, as explained in more detail and illustrated by FIG. 13, which is discussed herein-below.

According to an exemplary embodiment of the present disclosure, data may be transferred to the system, stored by the system and/or transferred by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present disclosure are contemplated for use with any configuration.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

Figure 13:
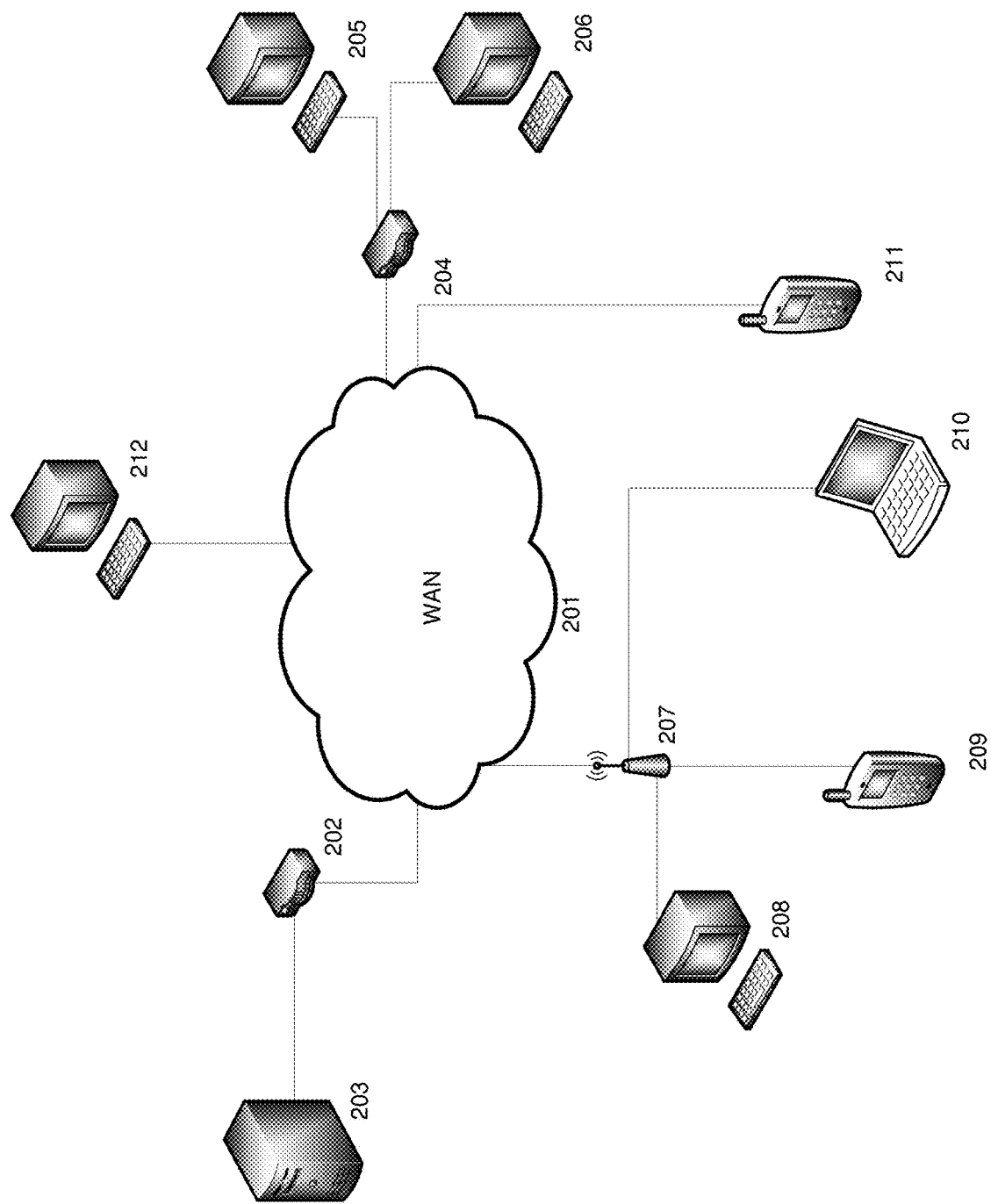
FIG. 13 is a schematic illustration of an exemplary network, in accordance with at least some exemplary embodiments of the present disclosure.

Referring to FIG. 13, a schematic overview of a system in accordance with an embodiment of the present disclosure is shown. The system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 13, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present disclosure may or may not utilize one or more routers 202. One of ordinary skill in the art would appreciate that there are numerous ways server 203 may connect to WAN 201 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 203 via WAN 201 or other network in numerous ways. For instance, a component or module may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the WAN 201. One of ordinary skill in the art will appreciate that there are numerous ways that a component or module may connect to server 203 via WAN 201 or other network, and embodiments of the present disclosure are contemplated for use with any method for connecting to server 203 via WAN 201 or other network. Furthermore, server 203 could be comprised of a personal computing device, such as a smartphone, acting as a host for other computing devices to connect to.

The communications means of the system may be any means for communicating data, including image and video, over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine (or networked configuration thereof) provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies. Within this field, the configuration and management of large networks include storage devices and computing devices that are communicatively coupled to dissimilar computing and storage devices over a network, such as the Internet, also referred to as "web" or "world wide web".

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

It will be apparent to those skilled in the art that various modifications and variations can be made to the disclosed apparatus, system, and method. Other embodiments will be apparent to those skilled in the art from consideration of the specification and practice of the disclosed method and apparatus. It is intended that the specification and examples be considered as exemplary only, with a true scope being indicated by the following claims.

What is claimed is:

1. A method, comprising:
providing a sensor attached to a vehicle;
controlling the vehicle to move toward a system;
using the sensor to sense data;
providing the sensed data to a detection module including computer-executable code stored in non-volatile memory;
controlling the sensor and the vehicle to perform a raster scan when the detection module detects a variation in the sensed data;
providing sensed raster scan data to the detection module;
using the detection module to generate a plurality of probability distribution curves based on the sensed raster scan data; and
using the detection module to generate a vector based on the plurality of probability distribution curves;
wherein the vector points to a location of the system;
wherein controlling the sensor and the vehicle to perform a raster scan includes controlling the sensor and the vehicle to perform a plurality of planar raster scans;
wherein the plurality of planar raster scans includes a first planar raster scan performed back and forth in a first plane, a second planar raster scan performed back and forth in a second plane that is different from the first plane, and a third planar raster scan that is performed back and forth in a third plane that is different from the first plane and from the second plane; and
identifying a first VOC maximum concentration based on the first planar raster scan, identifying a second VOC maximum concentration based on the second planar raster scan, identifying a third VOC maximum concentration based on the third planar raster scan, and spearing the vector through the first, second, and third VOC maximum concentrations.

2. The method of claim 1, wherein the sensor attached to the vehicle is a VOC sensor attached to a drone.

3. The method of claim 1, wherein the location of the system is a leak location of an oil and gas pipeline system.

4. The method of claim 1, further comprising moving wherein the vehicle moves back and forth within each of the first plane, the second plane, and the third plane, which are each substantially flat two-dimensional planes.

5. The method of claim 1, wherein generating the plurality of probability distribution curves includes generating a plurality of juxtaposed gaussian curves, each of the juxtaposed gaussian curves including a hotspot based on the sensed raster scan data.

6. The method of claim 5, wherein the hotspot is a maximum VOC concentration.

7. The method of claim 5, wherein the plurality of juxtaposed gaussian curves includes a first juxtaposition of gaussian curves based on sensed raster scan VOC data sensed during the first planar raster scan, a second juxtaposition of gaussian curves based on sensed raster scan VOC data sensed during the second planar raster scan, and a third juxtaposition of gaussian curves based on sensed raster scan VOC data sensed during the third planar raster scan.

8. The method of claim 7, wherein generating the vector includes spearing the vector through a first VOC maximum concentration defined by the first juxtaposition of gaussian curves, a second VOC maximum concentration defined by the second juxtaposition of gaussian curves, and a third VOC maximum concentration defined by the third juxtaposition of gaussian curves.

9. The method of claim 1, wherein the sensor is a sensor array including a VOC sensor, a geographic location sensor, and an altitude sensor.

10. A detection system, comprising:
a detection module, comprising computer-executable code stored in non-volatile memory;
a processor; and
a VOC sensor attached to a vehicle;
wherein the detection module, the processor, and the VOC sensor attached to the vehicle are configured to:
control the vehicle to move toward a system;
use the VOC sensor to sense VOC data;
control the VOC sensor and the vehicle to perform a planar scan when the detection module detects a variation in the sensed VOC data;
sense planar scan VOC data during the planar scan;
generate a plurality of gaussian curves based on the sensed planar scan VOC data;
generate a vector based on the plurality of gaussian curves;
wherein the vector points to a location of the system; and
wherein the planar scan includes a first planar raster scan in which the vehicle moves back and forth in a first plane, a second planar raster scan in which the vehicle moves hack and forth in a second plane that is different from the first plane, and a third planar raster scan in which the vehicle moves back and forth in a third plane that is different from the first plane and from the second plane; and wherein the VOC sensor identifies a first VOC maximum concentration based on the first planar raster scan, a second VOC maximum concentration based on the second planar raster scan, a third VOC maximum concentration based on the third planar raster scan, and spear the vector through the first, second, and third VOC maximum concentrations.

11. The detection system of claim 10, wherein the vehicle is a drone and the location of the system is a structural deficiency location of a pipeline.

12. The detection system of claim 10, wherein the plurality of gaussian curves includes a first juxtaposition of gaussian curves based on sensed planar scan VOC data sensed during the first planar raster scan, a second juxtaposition of gaussian curves based on sensed planar scan VOC data sensed during the second planar raster scan, and a third juxtaposition of gaussian curves based on sensed planar scan VOC data sensed during the third planar raster scan.

13. The detection system of claim 12, wherein generating the vector includes spearing the vector through a first VOC maximum concentration defined by the first juxtaposition of gaussian curves, a second VOC maximum concentration defined by the second juxtaposition of gaussian curves, and a third VOC maximum concentration defined by the third juxtaposition of gaussian curves.

14. The detection system of claim 10, wherein the VOC sensor attached to the vehicle is a VOC sensor attached to a drone, the system is an oil and gas pipeline, and the planar scan includes the VOC sensor attached to the drone flying above the oil and gas pipeline.

15. A method, comprising:
providing a sensor array including a VOC sensor attached to an aerial drone;
controlling the aerial drone to move toward a pipeline system;
using the VOC sensor to sense VOC data;
providing the sensed VOC data to a detection module including computer-executable code stored in non-volatile memory;
controlling the VOC sensor and the aerial drone to perform a raster scan when the detection module detects a variation in the sensed VOC data;
providing sensed raster scan VOC data to the detection module;
using the detection module to generate a plurality of gaussian curves based on the sensed raster scan VOC data; and using the detection module to generate a vector based on the plurality of gaussian curves;
wherein the vector passes through a location of the pipeline system;
wherein the raster scan includes a first planar raster scan in which the aerial drone moves back and forth in a first plane, a second planar raster scan in which the aerial drone moves back and forth in a second plane that is different from the first plane, and a third planar raster scan in which the aerial drone moves back and forth in a third plane that is different from the first plane and from the second plane; and
identifying a first VOc maximum concentration based on the first planar raster scan, identifying a second VOC maximum concentration based on the second planar raster scan, identifying a third VOC maximum concentration based on the third planar raster scan, and spear the vector through the first, second, and third VOC maximum concentrations.

16. The method of claim 15, wherein the first plane is a first substantially vertical plane, the second plane is a substantially horizontal plane, and the third plane is a second substantially vertical plane.

17. The method of claim 15, wherein the plurality of gaussian curves includes a first juxtaposition of gaussian curves based on sensed raster scan VOC data sensed during the first planar raster scan, a second juxtaposition of gaussian curves based on sensed raster scan VOC data sensed during the second planar raster scan, and a third juxtaposition of gaussian curves based on sensed raster scan VOC data sensed during the third planar raster scan.

\* \* \* \* \*